No. 876,234.

PATENTED JAN. 7, 1908.

G. L. PRESTON.
SPOKE PULLER.
APPLICATION FILED MAY 28, 1907.

WITNESSES

INVENTOR
George L. Preston
BY Munn & Co.
ATTORNEYS

THE NORRIS PETERS CO., WASHINGTON, D. C.

UNITED STATES PATENT OFFICE.

GEORGE L. PRESTON, OF TOWNVILLE, PENNSYLVANIA.

SPOKE-PULLER.

No. 876,234.      Specification of Letters Patent.      Patented Jan. 7, 1908.

Application filed May 28, 1907. Serial No. 376,049.

*To all whom it may concern:*

Be it known that I, GEORGE L. PRESTON, a citizen of the United States, and a resident of Townville, in the county of Crawford and State of Pennsylvania, have invented a new and Improved Spoke-Puller, of which the following is a full, clear, and exact description.

The invention relates to spoke pullers, and its object is to provide a new and improved spoke puller more especially designed for use by wheelwrights and other mechanics, and arranged to enable them to readily, quickly and conveniently pull out a checked, broken or otherwise defective spoke from the hub.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1:
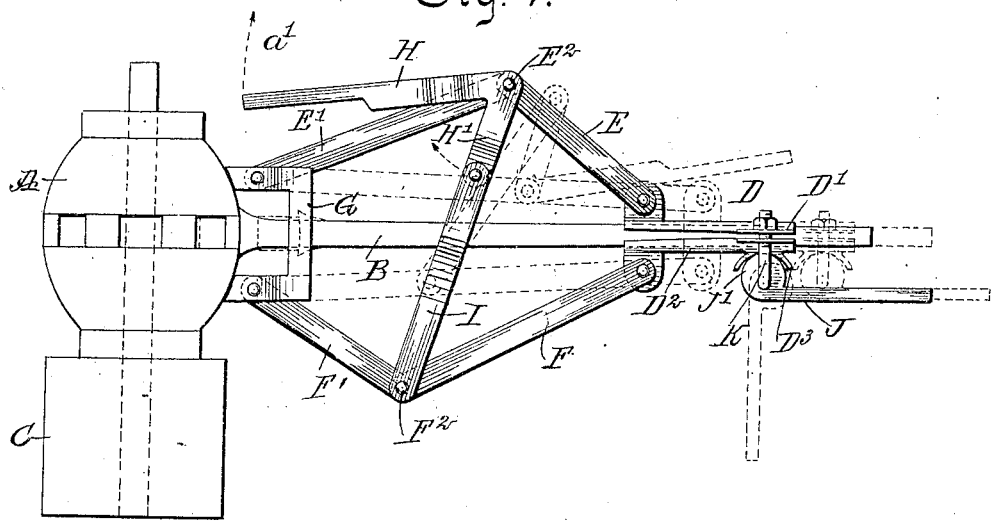
Figure 2:
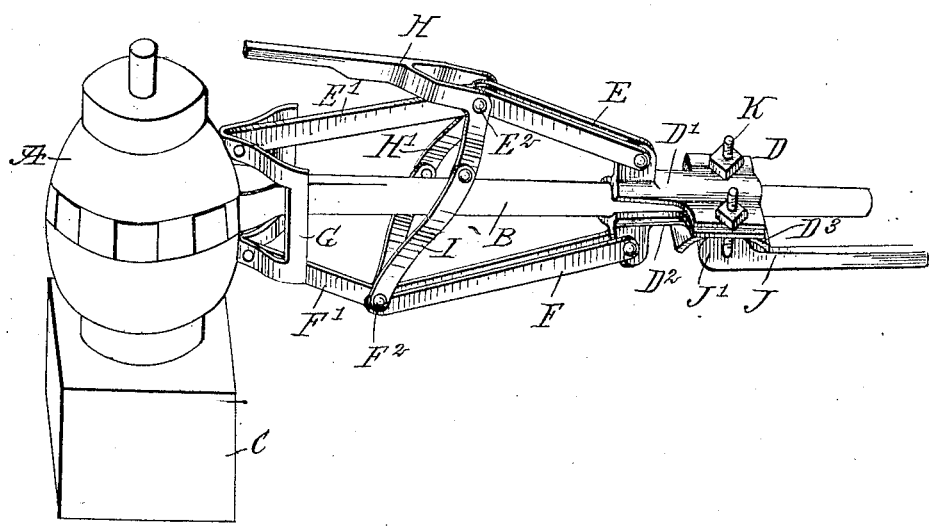

Figure 1 is a side elevation of the improvement as applied; and Fig. 2 is a perspective view of the same.

The hub A containing the defective spoke B to be pulled, is fastened in the usual manner on a wheelwright's stand C, of any approved construction. A manually controlled clamp D, is removably attached to the outer end of the spoke B, and on the said clamp D are fulcrumed the links E, F of a toggle, also having links E', F' pivotally connected with each other at their free ends by an angular abutment G, apertured for the passage of the spoke and adapted to rest on the hub A at opposite sides of the spoke B, as plainly shown in the drawings. A hand lever H, is fulcrumed on the pivot E² connecting the toggle links E, E' with each other, and the said hand lever H is provided with angular arms H', connected by links I with the pivot F² used for connecting the toggle links F and F' with each other. Now by the operator swinging the hand lever H into the position shown in the drawings the toggle is opened, and when the said lever is swung over into the position shown in dotted lines in Fig. 1 then the toggle is closed.

In using the device the clamp D is clamped to the spoke B with the toggle open and the abutment G resting against the hub A, and then the operator swings the hand lever H over in the direction of the arrow *a'* to close the toggle and thus cause an outward pull on the spoke B by the action of the clamp D fastened to the spoke B and moved outward in closing the toggle, so that the spoke is readily pulled out of its socket in the hub A. By arranging the sets of toggle links E, E' and F, F' on opposite sides of the spoke and engaging the abutment G with the hub A on opposite sides of the spoke socket, it is evident that when the toggle is closed as described, a straight line outward pull is exerted on the spoke B in the direction of the length of the spoke, to readily pull the same out of its socket without danger of breaking the spoke at its tenon engaging the hub socket. It will also be noticed that by the arrangement described, the spoke puller can be readily placed in position on a defective spoke without interfering with adjacent spokes.

The clamp D is preferably formed of two clamping members D', D², provided with apertured ears at their inner ends and fitting the spoke lengthwise on opposite sides, and on the member D² is formed a segmental bearing D³, engaged by the cam end J' of a cam lever J, fulcrumed on the middle member of a U-shaped bolt *k*, having its threaded side members engaging both clamping members D', D², to allow of adjusting the latter to spokes of different thicknesses. When the cam lever is swung downward into the position shown in dotted lines in Fig. 1, then the clamping members D', D² are open to permit of readily slipping the same over the free end of the spoke B to the desired position, that is, when the abutment G rests on the hub A and the toggle is open. The operator then swings the cam lever J upward to draw the clamping members D', D² toward each other into clamping engagement with the spoke B, to securely hold the clamp D in position on the spoke.

The device is very simple and durable in construction, easily applied, and composed of but few parts, not liable easily to get out of order.

Having thus described my invention, I claim as new and desire to secure by Letters Patent:

1. A spoke puller, comprising a clamp for removable attachment to a spoke and formed of two oppositely arranged members, each having an ear at its inner end, a link pivoted to the ear of each clamping member, links pivoted to the first named links, a substantially V-shaped abutment having an opening at the junction of its members for the passage of the spoke and adapted to engage the hub on opposite sides of said spoke, the last named links being pivoted to the abutment between its members and on opposite sides of the opening thereof, an angular lever having members of unequal length and pivoted at the junction of its members on the pivot of two of the links, and links pivoted on the pivot of the other two links and to the shorter member of the said lever.

2. A spoke puller, comprising a clamp for removable attachment to a spoke and formed of two members each provided with an ear at its inner end, a link pivoted to the ear of each clamping member, links pivoted to the first named links, an abutment having oppositely arranged members, the abutment being apertured for the passage of a spoke and adapted to rest upon the hub on opposite sides of said spoke, toggle levers pivoted to the ears of the members of the clamp and between the members of the abutment, on opposite sides of the opening thereof, and means connected with the toggle levers for operating the same.

In testimony whereof I have signed my name to this specification in the presence of two subscribing witnesses.

GEORGE L. PRESTON.

Witnesses:
M. L. FROSS,
H. D. FROSS.